United States Patent Office 3,212,242
Patented Oct. 19, 1965

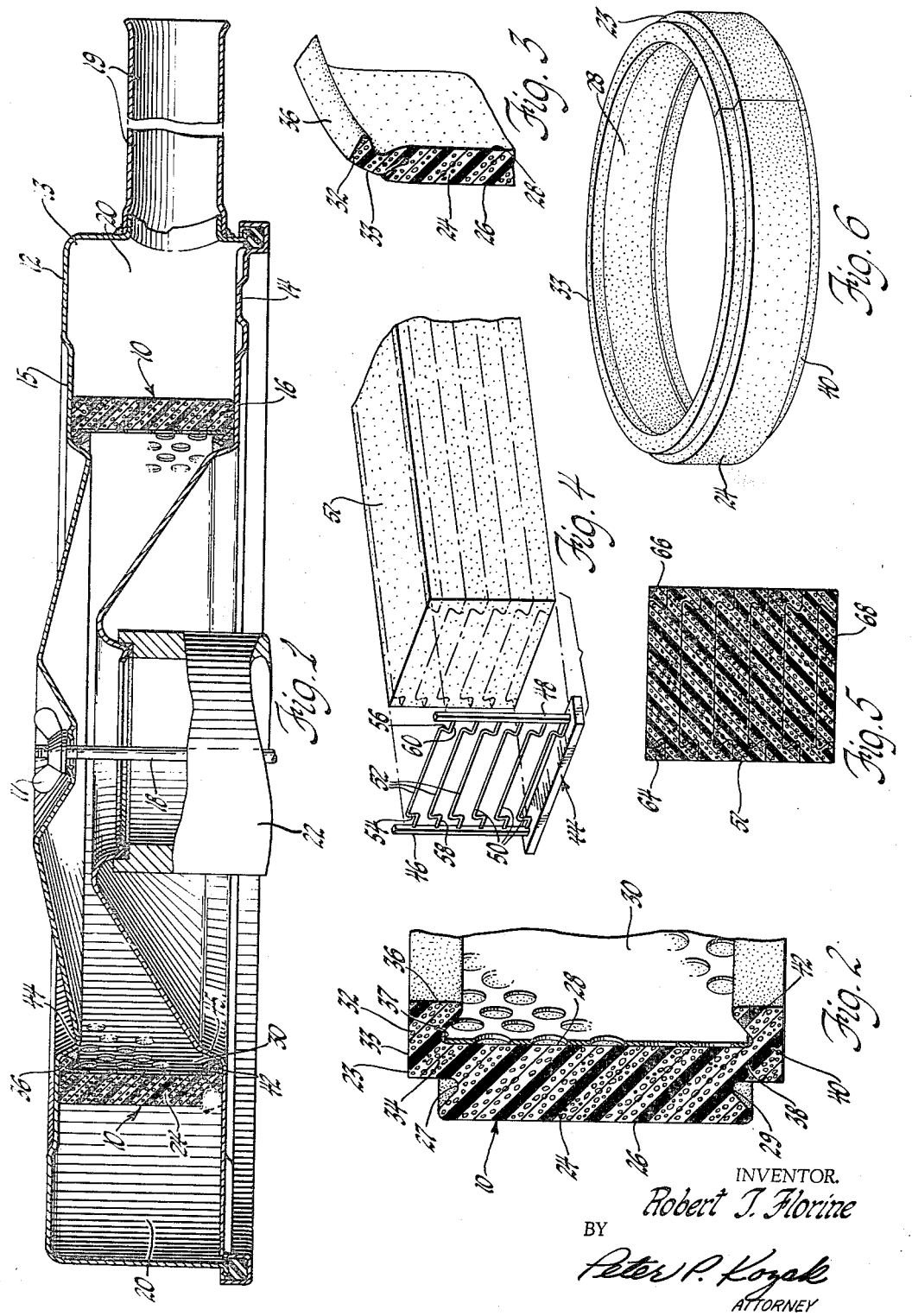

3,212,242
FILTER ELEMENT AND METHOD OF
MANUFACTURE THEREOF
Robert T. Florine, Flushing, Mich., assignor to General
Motors Corporation, Detroit, Mich., a corporation of
Delaware
Filed Oct. 18, 1962, Ser. No. 231,386
6 Claims. (Cl. 55—510)

This invention relates to filters and more particularly to improvements in replaceable filter elements for use in connection with internal combustion engines and the like.

One type of air filter in wide spread use on automobile internal combustion engines, lawn mowers and the like involves an air filter element in the form of an annulus or cylinder having end seals or gaskets which is clamped between a pair of spaced plate-like housing members whereby a fluid seal is formed between the filter element and the housing members. The air to be cleaned enters the filter housing radially of the filter element, proceeds through the cylindrical walls of the filter element to the space within the cylinder and thence axially of the filter element to the carburetor mechanism through a suitable conduit. A wide variety of different filter materials have been proposed and used in an annular filter element construction of this type. These include woven or randomly packed fibrous materials, paper in the form of a pleated annulus which is impregnated with a suitable phenolic resin and open-cell plastic materials such as rubber and polyurethane plastics.

Regardless of the type of material which is used as the filter medium a major problem in the manufacture of efficient filter elements which are designed to be merely clamped between spaced plate-like housing members is in the provision of suitable end gaskets on the cylindrical filter element so that when the element is clamped between the plate-like housing members, an efficient seal is formed between the filter element on the one hand and the plate-like members of the filter housing on the other. Various techniques have been employed in the past to provide suitable end gaskets for the filter elements. In instances where the filter medium is fibrous and flexible in nature, the filter material is merely wrapped around a cylindrical rigid supporting screen so that the axial ends extend beyond the ends of the supporting screen and the extending ends of the filter material are either folded over the screen ends, in some instances stapled to the screen, or these extending axial ends are securely clamped to the housing by special means associated with the filter housing. In instances where the filter medium is made of paper, the paper annulus is preferably placed between a pair of spaced annular screens and a suitable gasket material such as a polyurethane resin or a polyvinyl chloride plastisol is molded directly to the ends of the paper element to form suitable gaskets.

There is described in the copending patent application Serial No. 213,523, Chris A. Common et al., filed July 30, 1962, assigned to the assignee of the present invention and now abandoned, a unitary annular filter element adapted to be wrapped or slipped about an annular, relatively rigid supporting screen formed of an open-cell polyurethane resin which consists of an annular filter portion having integrally formed permanent, inwardly radially extending flanges at each end thereof. The permanently formed flanges in this type of filter element construction are highly desirable to its efficient use provided that these gasket portions serve as efficient seals and that means is provided to insure that the flange gaskets do not tend to slip from between the supporting screen and the housing members.

The above-mentioned patent application is a continuation of the patent application Serial No. 13,304, filed March 7, 1960, and now abandoned. In these applications there is described a method of fabricating a filter element having an inwardly directed, generally U-shaped configuration formed of elastic porous plastic material which is slipped or wrapped about a rigid annular supporting screen which as a unit is adapted to be clamped between the spaced dish-like filter housing members. The method involves cutting a plurality of nested dish-like slabs from a rectangular block of the elastic porous plastic material and bonding the ends of each slab together to form an annular element having a cylindrical portion and inwardly extending permanently formed flanges at each end thereof. The cylindrical screen element is of the same length as the cylindrical portion of the filter element so that the screen is designed to be located between the flanges and in alignment with the cylindrical portion thereof. The disadvantage of filter elements made by this technique is that in order to provide the flanges with sufficient body to effectively serve the function of an end gasket, these flange portions must extend at an angle of at least approximately 45° from the cylindrical portion of the element. However, even with an optimum angle, the resulting flanges have a wedge shape positioned so that the inner extremity of the flanges terminates in a very thin section so that unless the supporting screen is perfectly positioned, the flange portion which overhangs the supporting screen may be of relatively meager volume in some areas and may in some instances be squeezed out from between the supporting screen and the plate-like housing members to result in a defective seal. Further the gradually diminishing thickness of the flanges and their outwardly sloping configuration makes the precise location of the supporting screen element difficult which in turn increases the possibility that a defective seal will be formed when the filter element is installed in the filter housing. It is accordingly among the basic objects of this invention to provide an annular filter element of the type described including a cylindrical portion adapted to coextensively surround the outer surfaces of an annular, cylindrical, relatively rigid supporting screen and overhanging flanges on each end of the filter element which increase in volume toward the inner extremities thereof to provide gasket portions of substantial mass and which extend inwardly of the axial ends of the filter element to provide a filter element having more efficient end seal gaskets and a structure having means for more positively locating the supporting screen within the filter element. It is a further object of this invention to provide an efficient method for the manufacture of filter elements in accordance with the aforementioned objects with substantially no waste of filter material.

Other objects and advantages of the invention will be apparent from the following description and the drawings, in which:

FIGURE 1 is a cross-sectional view of a filter housing typically used in automobiles having a filter element compressed therebetween;

FIGURE 2 is a fragmentary cross-sectional view of a filter element;

FIGURE 3 is a fragmentary cross-sectional view of the filter element showing one gasket fold in the axial direction thereof;

FIGURE 4 is a perspective view of a block of porous plastic material and a hot wire means for slicing the block in accordance with this invention;

FIGURE 5 is a cross-sectional view of a block which has been cut in accordance with the process of the invention; and FIGURE 6 is a filter element formed into a cylindrical ring having the permanently formed ring end seals.

As described in the aforementioned patent applications, satisfactory flexible porous plastic material for use in the present invention consists of a polyurethane type open-cell foam, preferably a polyurethane synthetic resin which is the reaction product of an organic polyisocyanate and a polyester or polyether glycol made to have a suitable open-cell structure by subjecting the reacted foam product to the action of a hydrolyzing agent whereby a portion of the walls separating the adjacent pores of the foam is dissolved away leaving a skeleton-like structure and each pore communicates directly with an adjacent pore thereby forming a substantially 100% open-cell foam. Preferably the filter material is formed so that it has a density ranging from about 1.7 to 2.2 pounds per cubic foot and a cell or pore density ranging from about 30 to about 100 pores per lineal inch and a rubber-like elasticity.

The type of filter assembly to which this invention pertains is illustrated in FIGURE 1 which consists generally of the annular filter element assembly 10 sandwiched and compressed between the upper generally circular cup-like housing member 12 and the lower generally circular housing member 14 of more or less conventional design which meet to form an enclosed filtering chamber 13. The upper housing member 12 includes an annular circular plate portion 15 and the lower housing member 14 includes an annular circular plate portion 16 parallel to the portion 15. These plate-like portions are shaped so that they engage the filter element 10 squarely to exert a compressive force across the width of the filter element. The housing members are supported in a clamped relationship about the filter element 10 by means of a wing nut 17 and the bolt 18 attached to the engine. Air to be filtered enters the filter chamber 13 through a funnel 19 and passes to the annular space 20 forming the outer portion of the filter chamber 13, then passes through the filter material of the filter element 10 and thence downwardly to the carburetor through the vertically disposed cylindrical conduit 22.

This invention is concerned primarily with an improved filter element assembly 10 and with an efficient and economical method for fabricating it. Referring to the drawings, the filter element assembly of this invention consists of a flexible elastomeric porous plastic filter material in the form of an annulus 23 as shown in FIGURES 1 and 6 having a cross-sectional configuration as shown more clearly in FIGURE 2 supported on an annular, relatively rigid, perforated screen 30. The annular element 23 includes an axially elongated annular main body portion 24 having an outer cylindrical surface 26 and an inner cylindrical surface 28 and which is of suitable thickness to insure adequate filtration at a satisfactory air flow rate. The filter body portion 24 is supported on the annular, relatively rigid, perforated screen 30 preferably having a cylindrical inner and outer configuration and being of an axial length which is substantially equal to the axial length of the inner cylindrical surface 28 of the main body portion 24. For reasons which will be made clear hereinafter, the axial length of the inner cylindrical surface 28 is preferably equal to the axial length of the outer cylindrical surface 26. The main body portion 24 of the element has a radially extending annular flange or gasket portion 32 preferably having a flat outer radial surface 33 integrally attached thereto through an axial extension or segment 34 of reduced diameter extending outwardly along the inner cylindrical surface 28 of the main filter body 24 and terminating axially inwardly in an enlarged annular portion 36 extending radially inwardly of the end of the inner surface 28. The gasket portion 32 with its enlarged portion 36 forms a recess 37 flaring out axially inwardly to provide a means for locating and locking the supporting screen 30 within the element 23 and forms on its opposite or outward side a sealing surface 33. Radially outwardly of the segment 34 and the gasket portion 32 and axially outwardly of the outer portions of the main body portion 24 there is provided an annular cut-out or recess 27 which for reasons to be set forth hereinafter is preferably of the same configuration as the enlarged portion 36 of the gasket portion. The opposite end of the filter element has a seal structure which may be considered an inverted image of the segment 34 and the radial seal or gasket portion 32 and consists of the axially extending segment 38 integrally attached to the main body portion in the form of an extension along the inner cylindrical surface 28 of the main body portion, the gasket portion 40 integrally attached thereto and terminating in an enlarged annular portion 42 extending radially inwardly of the main body portion and the annular recess or cut-out 29. The enlarged portions 36 and 42 extend axially inwardly of the axial ends of the cylindrical portion 28 so that when, as shown in FIGURE 2, the supporting screen 30 is fitted in place adjacent the cylindrical surface 28, the enlarged portions 36 and 42 extend axially inwardly of the ends of the cylindrical portion 28 of the main body member and the axial ends of the supporting screen 30. The reduced thickness of the segments 34 and 38 permits the gasket portions 32 and 40 to be readily flexed so that the gasket portions 32 and 40 may be flexed axially outwardly as shown in FIGURE 3 whereby the supporting screen 30 may be readily slipped into place.

The radially extending gasket portions 32 and 40 each serve as a gasket when the filter element assembly is clamped between the flat portions 15 and 16 of the filter housing as shown in FIGURE 1. These gasket portions are compressed between the flat portions 15 and 16 of the housing and the screen support 30 so that the enlarged portions 36 and 42 wrap around the ends of the screen element 30 as shown in FIGURE 1. To obtain optimum gasketing the upper and lower housing members 12 and 14 are preferably provided with inwardly directed annular segments 44 and 45 adjacent the flat portions 15 and 16 thereof respectively to cause the enlarged portions 36 and 42 to be bent radially against the screen element 30. It will further be observed that when the gasket portions 32 and 40 are clamped in the housing and are compressed inwardly of the filter element assembly 10, these gasket portions are crowded outwardly into the cut-out portions 27 and 29 whereby the main body portion 24 of the filter element remains essentially in an uncompressed state so that the filtering capacity of the element is unimpaired.

It is to be observed that as shown in FIGURE 2, the filter element construction in its free state has the enlarged portions 36 and 42 of the filter element overhanging the upper and lower ends of the supporting screen 30 to insure that when the supporting screen 30 is slipped in place and the element is inserted in the housing as shown in FIGURE 1, there is virtually no chance that the gasket material will slip from around the axial ends of the supporting screen 30.

An important feature of the invention resides in the process for making the filter element 23 which may readily be visualized in connection with FIGURES 4, 5 and 6. The process involves first forming a rectangular block of the thermoplastic porous elastic open-cell material which has a length equal to the circumference of the element 23 and a width equal to the height of the element 23 between the outer surfaces of the gasket elements 32 and 40. This block is then cut into a series of identical slabs, one nested upon the other, by means of a hot wire cutting apparatus 44. The apparatus 44 consists of electrical conductors 46 and 48 between which there is supported a plurality of cutting wires 50 of identical configuration spaced an identical distance apart, the distance of the central linear portions of the wires being equal to the radial thickness of the main body portion 24 of the filter element. The cutting element 44 is merely passed through the block 51 as indicated by the broken lines of FIGURE 4 or conversely the block 51 may be passed through the cutting element. FIGURE 5 shows a cross-sectional end view of the block after it has been cut by the operation just described. The cut portions in the block, of course, are identical in configuration to the cutting wires 50. These consist as indicated in FIGURE 4 of an intermediate flat or lineal portion 52 corresponding in length to the surfaces 26 and 28 of the filter element, a downwardly extending S-curved portion 54 on one side thereof whereby the configuration moves inwardly of the flat portion 52 and corresponds to the configuration of the cut-out portion 29 of the filter element, a reversed S configuration 56 on the opposite end of the flat portion 52 whereby this configuration likewise moves inwardly of the flat portion 52 and corresponds in configuration to the cut-out portion 27 of the filter element, and finally the segments 58 and 60 parallel to the flat portion 52 extending to the edge of the block which together with the curved portions 54 and 56 correspond to the enlarged portions 36 and 42 of the gasket elements. It will be observed that a slab defined by two such cuts is identical to the filter element configuration shown in FIGURE 2. An entire block of this material may be cut into slabs with only the corner edges 64 and 66 and the base portion 68 representing waste. It will be observed that a single cut made by any intermediate wire forms the outer surfaces of the element below and the inner surfaces of the element above.

In the manufacture of the filter elements 23 a suitable adhesive is first preferably applied to an end face of the block 51. The cutting element 44 is then drawn through the block to cut the slabs is stacked relationship as shown in FIGURE 4. Thereafter it is only necessary to remove the upper slab from the stack and hold the ends of the element firmly together to form the element shown in FIGURE 6. Preferably an adhesive is used which will fully cure in response to room temperatures or low temperatures in the vicinity of 200° F. to 300° F. In instances where polyurethane plastics are employed as the filter material, it is preferred to use a polyurethane cement which preferably consists of a polymeric material in a suitable solvent containing reactive isocyanate groups. After curing the cement, the supporting screen 30 may be inserted in place to complete the assembly of the filter element.

While the embodiment of the present invention as disclosed herein constitutes a preferred form, it is to be understood that other forms may be adopted without departing from the spirit of the invention.

I claim:

1. An annular filter element composed of a porous elastic foamed plastic material adapted to be compressibly inserted between circular surfaces of a pair of spaced filter housing members for radial flow filtration therebetween comprising a main body annular portion of substantial thickness and axial length having substantially cylindrical inner and outer axial surfaces of equal length, said inner surface being adapted to receive adjacent thereto a perforated relatively rigid annular supporting screen having an axial length substantially equal to that of said main body cylindrical surfaces, a first annular sealing gasket portion adapted to provide a radial seal between said main body portion and one of said circular surfaces, said first sealing gasket being integrally attached to one end of said main body portion through an axially outwardly extending annular segment of reduced cross section which forms an extension of said main body portion only at an inner annular portion thereof adjacent said inner axial surface, said first gasket including an enlarged annular portion extending radially inwardly of said inner axial surface and axially inwardly of the axial extremity of said inner cylindrical surface adjacent thereto whereby said gasket and said main body member are adapted to completely envelop a screen end positioned adjacent said main body portion, said segment being of sufficiently thin cross-sectional area to permit said gasket to be readily bent axially outwardly for efficient insertion of said screen within the filter element, and a second sealing gasket portion integrally attached to the opposite end of said main body portion through a segment which together with the segment is an inverted image of said first gasket portion and said segment.

2. An annular filter element composed of a porous elastic foamed plastic material adapted to be compressibly inserted between circular surfaces of a pair of spaced filter housing members for radial flow filtration therebetween comprising a main body annular portion of substantial thickness and axial length having substantially cylindrical inner and outer axial surfaces of equal length, said inner surface being adapted to receive adjacent thereto a perforated relatively rigid annular supporting screen having an axial length substantially equal to that of said main body cylindrical surfaces, a first annular sealing gasket portion adapted to provide a radial seal between said main body portion and one of said circular surfaces which is integrally attached to one end of said main body portion through a first axially outwardly extending annular segment of reduced cross section which forms an extension of said main body portion only at an inner annular portion thereof adjacent said inner axial surface whereby an annular cut-out portion is formed between said segment and said outer axial surface, said gasket including an enlarged annular portion extending radially inwardly of said inner axial surface and axially inwardly of the axial extremity of said inner cylindrical surface adjacent thereto, said enlarged portion being equal in volume and geometric configuration to said cut-out portion, said segment being of sufficiently thin cross-sectional area to permit said gasket to be readily bent axially outwardly for efficient insertion of said screen within the filter element, and a second sealing gasket portion integrally attached to the opposite end of said main body portion through a segment which together with the segment is an inverted image of said first gasket portion and said first 3. An annular filter element composed of a porous elastic foamed plastic material adapted to be compressibly inserted between flat circular surfaces of a pair of spaced filter housing members for radial flow filtration therebetween comprising a main body annular portion of substantial thickness and axial length having substantially cylindrical inner and outer axial surfaces of equal length, said inner surface being adapted to receive adjacent thereto a perforated relatively rigid annular supporting screen having an axial length substantially equal to that of said main body cylindrical surfaces, a first annular sealing gasket portion adapted to provide a radial seal between said main body portion and one of said circular surfaces and which is integrally attached to one end of said main body portion through an axially outwardly extending annular segment of reduced cross section which forms an extension of said main body portion only at an inner annular portion thereof adjacent said inner axial surface whereby an annular cut-out portion is formed between said segment and said outer axial surface, said gasket including an enlarged annular portion extending radially inwardly of said inner axial surface and axially inwardly of the axial extremity of said inner cylindrical surface adjacent thereto, said enlarged portion being equal in volume and geometric configuration to said cut-out portion, said segment being of sufficiently thin cross-sectional area to permit said gasket to be readily bent axially outwardly for efficient insertion of said screen within the filter element, and a second sealing gasket portion integrally attached to the opposite end of said main body portion through a segment which together with the segment is an inverted image of said gasket portion and said segment, the space between said gaskets being equal in configuration to the outer portion of said main body member between said cut-out portion, and a second annular sealing gasket portion integrally attached to the opposite end of said main body portion through a second axial segment which in cross-sectional configuration is an inverted image of said first gasket and said first segment, the main body portion between said cut-out portions being identical in configuration to the space between said gasket enlarged portions.

4. An air filter device comprising an upper housing member, a lower housing member and a filter element assembly clamped therebetween, said filter element assembly comprising an annular filter element composed of a porous elastic foam plastic material wrapped about an annular rigid perforated support member, said filter element comprising a main body annular portion of substantial thickness and axial length having substantially cylindrical inner and outer axial surfaces of equal length, said support member being disposed adjacent said inner surface and being substantially coextensive therewith, a first annular sealing gasket portion integrally attached to one end of said main body portion through a first axially outwardly extending annular segment of reduced cross section which forms an extension of said main body portion only at an inner annular portion thereof adjacent said inner axial surface whereby an annular cut-out portion is formed between said segment and said outer axial surface of said main body portion, said gasket portion being interposed and compressed between one of said housing members and said support member and including an enlarged annular portion extending radially inwardly of said inner axial surface and axially inwardly of the axial extremity of said cylindrical surface adjacent thereto and being equal in volume and geometric configuration to said cut-out portion, and a second sealing said main body portion through a second segment which gasket portion integrally attached to the opposite end of together with the segment is an inverted image of said first gasket portion and said first segment, said second gasket portion being clamped between said support member and the other filter housing member whereby said enlarged portions wrap around and sealingly engage the axial ends of said support member, said first and second gasket portions in a compressed state being distorted and substantially filling said cut-out portions whereby said main body member is maintained substantially in a free state.

5. An air filter device comprising an upper housing member, a lower housing member and a filter element assembly clamped therebetween, said filter element assembly comprising an annular filter element composed of a porous elastic foam plastic material wrapped about an annular rigid perforated support member, said filter element comprising a main body annular portion of substantial thickness and axial length having substantially cylindrical inner and outer axial surfaces of equal length, said support member being disposed adjacent said inner surface and being substantially coextensive therewith, a first annular sealing gasket portion integrally attached to one end of said main body portion through a first axially outwardly extending annular segment of reduced cross section which forms an extension of said main body portion only at an inner annular portion thereof adjacent said inner axial surface, said gasket portion being interposed and compressed between one of said housing members and one end of said support member and including an enlarged annular portion extending radially inwardly of said inner axial surface and axially inwardly of the axial extremity of said cylindrical surface adjacent thereto, and a second sealing gasket portion integrally attached to the opposite end of said main body portion through a second segment which together with the segment is an inverted image of said first gasket portion and said first segment, said second gasket portion being clamped between said support member and the other filter housing member whereby said enlarged portions wrap around and sealingly engage the axial ends of said support member.

6. An air filter device comprising an upper housing member, a lower housing member and a filter element assembly clamped therebetween, said filter element assembly comprising an annular filter element composed of a porous elastic foam plastic material wrapped about an annular rigid perforated support member, said filter element comprising a main body annular portion of substantial thickness and axial length having substantially cylindrical inner and outer axial surfaces of equal length, said support member being disposed adjacent said inner surface and being substantially coextensive therewith, a first annular sealing gasket portion integrally attached to one end of said main body portion through a first axially outward extending annular segment of reduced cross section which forms an extension of said main body portion only at an inner annular portion thereof adjacent said inner axial surface, said gasket being interposed and compressed between one of said housing members and said support member and including an enlarged annular portion extending radially inwardly of said inner axial surface and axially inwardly of the axial extremity of said cylindrical surface adjacent thereto, and a second sealing gasket portion integrally attached to the opposite end of said main body portion through a segment which together with the segment is an inverted image of said first gasket portion and said first segment, said second gasket portion being clamped between an end of said support member and a filter housing member whereby said enlarged portions wrap around and sealingly engage the axial ends of said support member, and means associated with said housing members compressing the enlarged portions of said gasket portions radially against walls of said support member.

References Cited by the Examiner

UNITED STATES PATENTS

| 2,677,747 | 5/54 | Jaye | 264—168 |
| 2,966,960 | 1/64 | Rochlin | 55—502 |

FOREIGN PATENTS

| 1,136,695 | 12/56 | France. |
| 843,483 | 8/60 | Great Britain. |
| 907,236 | 10/62 | Great Britain. |

HARRY B. THORNTON, *Primary Examiner.*

UNITED STATES PATENT OFFICE
CERTIFICATE OF CORRECTION

Patent No. 3,212,242                              October 19, 1965

Robert T. Florine

It is hereby certified that error appears in the above numbered patent requiring correction and that the said Letters Patent should read as corrected below.

Column 4, line 58, for "thermosplastic" read -- thermoplastic --; column 5, line 28, for "is" read -- in --; column 6, line 35, for "and said first" read -- and said first segment. --; column 7, lines 28 and 29, strike out "said main body portion through a second segment which gasket portion integrally attached to the opposite end of" and insert instead -- gasket portion integrally attached to the opposite end of said main body portion through a second segment which --; column 8, line 26, for "outward" read -- outwardly --; line 44, for "against walls of" read -- against the walls of --; line 51, for "1/64" read -- 1/61 --.

Signed and sealed this 5th day of July 1966.

(SEAL)
Attest:

ERNEST W. SWIDER                            EDWARD J. BRENNER
Attesting Officer                          Commissioner of Patents